United States Patent [19]
Parker

[11] 3,754,983
[45] Aug. 28, 1973

[54] ARTICLES COATED WITH WAX COMPOSITION AND METHOD OF MAKING

[75] Inventor: Vernon D. Parker, Lawrence, Kans.

[73] Assignee: Union Oil Company of California, Los Angeles, Calif.

[22] Filed: Jan. 28, 1971

[21] Appl. No.: 110,661

[52] U.S. Cl............ 117/148, 117/150, 117/155 UA, 117/158
[51] Int. Cl............................................. B27k 3/34
[58] Field of Search.................. 260/28.5 AV, 86.7, 260/89.1, 23 H, 414; 252/316; 117/158, 148, 150, 149, 168, 155 UA

[56] References Cited
UNITED STATES PATENTS

| | | | |
|---|---|---|---|
| 3,428,591 | 2/1969 | Lewis | 117/158 X |
| 3,522,081 | 7/1970 | Moyer | 117/158 X |
| 3,231,462 | 1/1966 | Oswald et al. | 117/158 X |
| 3,369,932 | 2/1968 | Sawyer et al. | 117/158 X |
| 3,181,765 | 5/1965 | Bonzagni et al. | 229/3.5 |
| 3,189,573 | 6/1965 | Oken | 260/28.5 |
| 3,329,499 | 7/1967 | Garrett et al. | 96/1 |
| 3,326,680 | 6/1967 | Garrett | 96/1 |
| 3,244,735 | 4/1966 | Artman | 260/414 |
| 2,618,536 | 11/1952 | Hann | 44/7 |
| 2,892,780 | 6/1959 | Rinse | 252/35 |
| 3,491,075 | 1/1970 | Dekking | 260/87.3 |

*Primary Examiner*—William D. Martin
*Assistant Examiner*—M. R. Lusignan
*Attorney*—Milton W. Lee, Richard C. Hartman, Lannas S. Henderson, Dean Sandford and Robert E. Strauss

[57] ABSTRACT

Novel high-melting wax compositions are prepared by heat-curing a mixture of petroleum wax, an olefin-vinyl ester copolymer and an aluminum polyalkoxide. Novel coating methods utilizing the new wax compositions are also disclosed.

7 Claims, No Drawings

ARTICLES COATED WITH WAX COMPOSITION AND METHOD OF MAKING

BACKGROUND OF THE INVENTION

This invention relates to wax compositions, especially wax compositions designed for use at relatively high temperatures. A common defect of most waxes is that they are limited to use at relatively low temperatures, i.e., less than about 200°F. Due to their low melting points, when waxes are used to coat or impregnate paperboard for manufacture of water resistant paper products or to coat wood panels or other molded articles, they have a tendency to melt and flow at temperatures encountered in warm storage areas or in locations where the final use may be at relatively high temperatures. In other uses, for example in candles where the wax is to be burned, problems are encountered in that the wax material close to the flame tends to melt and flow which may be unsightly and also wasteful of the wax. Also wax compositions may have too low a viscosity when molten to be useful for some applications where dripping is a problem. Thus it is also desirable to prepare molten wax compositions which have higher viscosities than those of the wax per se.

Many attempts have been made to overcome these undesirable characteristics of waxes. Considerable success has been achieved in improving the viscosity characteristis of molten wax, as well as increasing the final melting point of wax blends, by adding certain foreign materials such as polymers to the wax blends. Thus, it is common practice to add polyolefins such as polyethylene to wax blends to enhance their strength, flexibility and wear resistance. Unfortunately, the use of large quantities of polymer can be too expensive for many end uses. Furthermore, even when large quantities of polymer are used the wax blends still suffer the handicap of melting at quite low temperatures, never higher than the melting point of the polymer itself.

Thus, there has been a long felt need for inexpensive wax compositions that will remain rigid, or at least will not flow or drip at temperatures substantially above the melting point of the wax itself. Moreover there has been a need for wax compositions which could be used to prepare coated or impregnated paperboard having a high wet strength, i.e., paperboard which will remain strong after soaking in water. Also there is a need for increasing the viscosity of liquid wax blends for applications where low viscosities are unsatisfactory.

SUMMARY OF THE INVENTION

This invention contemplates new wax-polymer compositions containing a gel-forming agent, and also novel methods for their preparation. The new compositions comprise mixtures of petroleum wax, a copolymer of a lower olefin (two to five carbon atoms) and a vinyl ester of a lower alkanoic acid (one to six carbon atoms), and a gel-forming agent comprising a reactive aluminum polyalkoxide compound.

The gel-forming agent reacts with the hot wax-polymer blends to form viscous liquids, gels, or even essentially rigid solidified compositions which have melting points much higher than the melting points of the wax-polymer blends prior to reaction with the gel-forming agent. The reaction is carried out at temperatures which depend upon the specific gel-forming agent and polymer used as well as the concentration of such agents and polymers in the wax blends. Generally the wax blends are maintained at above their melting points for at least about three minutes and preferably for at least about 10 minutes. Some reactive species of gel-forming agents can be reacted at even below the melting point of the wax, e.g., by milling a dry blend of polymer-wax and gel-forming agent in a rubber mill; however, it is preferable to react the blend under molten conditions at temperatures ranging from about 200° to about 450°F. for times ranging between about 5 minutes and 5 hours.

It is not certain what the precise mechanism of the gelling reactions is. However, it is theorized that a crosslinking reaction occurs which involves ester exchange between the polymer and the metal alkoxide. Thus for example with aluminum secondary butoxide the gel-forming reaction is believed to be based on the following reaction.

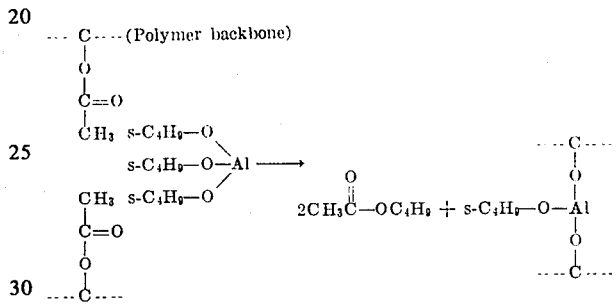

Thus, in this reaction an ester exchange occurs which results in the cross-linking of 2 polymer molecules with an aluminum alkoxide molecule. This theory is fairly well substantiated by the fact that esters have been found to be released or liberated as a result of the cross linking action. Thus in the case of aluminum secondary butoxide, butyl acetate has been found to be present in the reaction product.

It is believed that the wax does not participate in the reaction directly since a gel is formed when only the polymer and the gel-forming agent are mixed even in the absence of wax. It is believed that a highly intricate gel structure is formed which completely enmeshes the wax molecules. This is substantiated by the fact that the fully gelled compositions do not bleed at high temperatures; there is essentially no syneresis. As a result of this effect candles have been prepared from the gels of this invention which do not drip while burning but appear to be consumed by the flame essentially directly from the solid or semi-solid state. Moreover, the gels are found to be capable of supporting combustion in a candle shape without the necessity of a wick. The advantages of the compositions of this invention for use wherever syneresis may be a problem are apparent.

After the reaction is carried out, the wax blends can be either solid gels or viscous liquids depending upon the amounts of polymer, gel-forming agent, wax and length of curing time employed. After cooling, the compositions are in the form of rigid, strong, solid masses whose appearance is essentially the same as the wax itself. The melting point of the reacted blend however is far above the melting point of the wax component. In fact some reacted gels do not melt below their decomposition temperatures. Such heat-resistant waxes do not flow or drip even in direct contact with a flame. Thus they are useful in such applications as non-dripping candles and temperature-resistant coatings.

The softened gels can be pressed or extruded at high temperatures and pressures upon articles to be coated. However it is preferable in most cases to coat the uncured reaction mixture upon the article to be coated, e.g., wood panels or paperboards and then to cure or react the blend in situ on the article. In the case of paperboard the latter technique produces a very high wet-strength product.

Novel, high-viscosity liquid wax compositions can also be prepared in accordance with this invention by forming a gel as described, and then breaking it down by prolonged heating, e.g., at least about 20 hours and sometimes as much as several days at temperatures above about 300°F. These liquids are useful wherever liquid wax blends are conventionally used, e.g., for impregnating corrugated paperboard and for use in wax curtain coating processes and the like.

Generally the gel-forming agents of this invention are aluminum alkoxides having the structure:

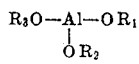

wherein $R_1$ and $R_2$ represent alkyl groups having from one to about 20, preferably two to 12, carbon atoms, and $R_3$ is either an alkyl group as defined for $R_1$ and $R_2$, or an aliphatic acyl group having from two to 24, preferably 10 to 20, carbon atoms.

Specific aluminum alkoxides contemplated herein include aluminum methoxide, aluminum ethoxide, aluminum isopropoxide, aluminum n-butoxide, diisopropoxy-ethoxy aluminum, diisopropoxy-t-butoxyaluminum, isopropoxy-dipentoxyaluminum, diethoxydodecoxyaluminum, aluminum ethylhexoxide (derived from 2-ethyl hexanol), aluminum decoxide (derived from decyl alcohol), aluminum secbutoxide-diisopropoxide, and the like.

Especially preferred are the aluminum compounds having three alkoxy groups or two alkoxy groups and a acyloxy group, e.g., aluminum secondary butoxystearate.

The waxes used in the present invention can be any of the conventional commercial petroleum waxes. Thus, paraffin waxes melting in the range of about 130°–160°F. may be used, as well as microcrystalline waxes melting up to about 200°F., and mixtures thereof.

Suitable copolymers for use herein include primarily the wax-compatible copolymers of ehtylene, propylene or isobutene with a vinyl ester of acetic, propionic, or butyric acids. Particularly preferred are the ethylene-vinyl acetate copolymers containing from about 10–40 percent vinyl acetate marketed by E. I. DuPont de Nemours under the trade names Elvax 150, 220, 240, 250 and 260.

Suitable proportions of the various ingredients may range as follows:

| Weight-Percent | Broad Range | Preferred Range |
|---|---|---|
| Wax | 50–98 | 70–90 |
| Copolymer | 2–40 | 5–30 |
| Aluminum alkoxide | 0.2–10 | 1–5 |

The invention may be better understood by reference to the following detailed description and specific examples and illustrations of the invention.

DETAILED DESCRIPTION AND EXAMPLES OF THE INVENTION

Examples 1 to 22

In these examples wax-ethylene vinylacetate copolymer-aluminum alkoxide blends were prepared using a wide range of concentrations of the various ingredients. The wax was first melted in a steam jacketed vessel, and the ethylene vinyl acetate copolymer and aluminum alkoxide were then added in the concentrations shown. In Table 1 the aluminum alkoxide gel agent and ethylene vinyl acetate concentrations are given, the remainder being the wax which was a high purity paraffin wax consisting principally of straight chain hydrocarbons melting at a temperature range of 143° to 150°F., and sold under the trade name Aristowax 143/150. Various concentrations of ethylene-vinyl acetate copolymer ranging from about 5 to 30 weight-percent, and concentrations of aluminum alkoxide ranging from 0.2 to 3 percent were used. After the blends were thoroughly mixed and the additives were dissolved or dispersed in the wax, the blends were placed in beakers in an oven at the temperatures indicated in the Table and allowed to stand for at least about 16 hours, ranging up to 28 hours for some samples. The samples were then inspected for gel formation or for viscosity changes which occured during the course of the reaction.

TABLE 1

| Example | Aluminum Alkoxide (Wt.%)[1] | Ethylene-Vinyl Acetate (Wt.%)[2] | Product Characteristics After Reaction |
|---|---|---|---|
| 1 | 0.2 | 10.0 | |
| 2 | 0.2 | 20.0 | |
| 3 | 0.2 | 30.0 | No gel at 300°F. Viscosity increase of 10 to 300%. |
| 4 | 0.5 | 10.0 | |
| 5 | 0.5 | 20.0 | |
| 6 | 0.5 | 30.0 | |
| 7 | 0.8 | 10.0 | |
| 8 | 0.8 | 20.0 | 93 Vol-% gel at 300°F. |
| 9 | 0.8 | 30.0 | 90 Vol-% gel at 300°F. |
| 10 | 1.0 | 10.0 | No gel at 200°F. |
| 11 | 1.0 | 20.0 | No gel at 200°F. |
| 12 | 1.2 | 5.0 | 25 Vol-% gel at 200°F. |
| 13 | 1.2 | 10.0 | 100 Vol-% gel at 200°F. |
| 14 | 1.2 | 20.0 | 100 Vol-% gel at 200°F. |
| 15 | 1.5 | 5.0 | 80 Vol-% gel at 200°F. |
| 16 | 1.5 | 10.0 | 100 Vol-% gel at 200°F. |
| 17 | 1.5 | 20.0 | 100 Vol-% gel at 200°F. |
| 18 | 2.0 | 10.0 | 100 Vol-% gel at 200°F. |
| 19 | 2.0 | 20.0 | 100 Vol-% gel at 200°F. |
| 20 | 3.0 | 5.0 | 85 Vol-% gel at 200°F. |
| 21 | 3.0 | 10.0 | 100 Vol-% gel at 200°F. |
| 22 | 3.0 | 20.0 | 100 Vol-% gel at 200°F. |

[1] Aluminum (secondary butoxy)$_{2.6}$(stearate)$_{0.4}$
[2] Copolymer having about 28% vinyl acetate and a melt index of about 150. Marketed by E. I. DuPont de Nemours under trade name Elvax 220.

It was noted during the course of the reactions that the viscosity of the mixes increased as the reaction progressed. However little or no gel formed until about 0.8 to 1.0 weight-percent of the aluminum alkoxide additives were used. Thus at lower alkoxide concentrations the only observable effect was the increase in liquid viscosity. It was noted that with about 0.2 weight-percent alkoxide the viscosity increased from about 10 to 20 percent during the course of the reaction. With 0.5 weight-percent alkoxide the viscosity increased about 150 to 180 percent and with 0.8 weight-percent alkoxide, viscosity increases up to about 300 percent were observed.

The gels which were recovered after the reaction were very high melting and would not flow under their own weight when the beakers containing them were turned upside down. Even at 350°F. the gels did not melt.

Examples 23 to 26

In these examples the effectiveness of aluminum 2-ethylhexoxide and aluminum isopropoxide were compared. The wax was first melted and heated to 300°F. after which the ethylene-vinyl acetate copolymer was added. The copolymer (Elvax 260 marketed by E. I. DuPont de Nemours) had a ratio of ethylene to vinyl acetate of about 72 to 28 and a melt index of about 2.5 to 3.5. After the copolymer was dissolved a homogeneous blend was obtained at a temperature of about 290°F. The blend was then cooled to 222°F. and the aluminum alkoxide was added. After a homogeneous blend had again been attained, 4 pieces of corrugated paperboard measuring 4 inches by 4¾ inches by ⅛ inch thickness were dipped into the blend for one minute. The dipped boards were then allowed to drain for 3 minutes at 230°F. to remove excess wax, and were then cured for about 15 to 33 minutes at 300°F. The various batches which were prepared, with the constituents and their curing times are indicated below in Table 2.

TABLE 2

| Example | Wax (grams) | Elvax 260 (grams) | Alkoxide (grams) | Curing °F. | Minutes |
|---|---|---|---|---|---|
| 23 | 2215[1] | 554 | 28.4[2] | 300 | 15 |
| 24 | 2215[1] | 554 | 40.0[2] | 300 | 26 |
| 25 | 2215[1] | 554 | 20.0[3] | 300 | 20 |
| 26 | 728[4] | 182 | 4.9[3] | 300 | 19 |

[1]Paraffin wax having a melting range of 143°–150°F. (marketed by Union Oil Company of California as Aristowax 143/150).
[2]Aluminum 2-ethylhexoxide
[3]Aluminum isopropoxide
[4] 50% Aristowax 143/150 and 50% chlorowax, a chlorinated paraffin wax The boards picked up an average of about 38 percent by weight of coating material and after curing were found to have very smooth surfaces. The tensile strength of the boards after soaking in water for 19 hours at 73°F. was measured and found to be approximately equivalent to that of similar boards treated with the wax-polymer blend without the alkoxide gel agent additive. However the boards were found to have much greater rigidity, i.e., less flexibility, which was indicative of increased tensile strength due to reaction with the gel agent. After gelling, the wax on the paperboard was solid and did not melt at 300°F.

Example 27

In this example a blend of slackwax (paraffin wax containing about 5 percent hydrocarbon oils) was melted and blended with a styrene-vinyl toluene copolymer (Piccotex 120 marketed by the Pennsylvania Industrials Chemical Company) and with ehtylene-vinyl acetate copolymer in proportions by weight of about 93/5/2. A specimen of test paperboard was impregnated with this blend. About 1.5% by weight of aluminum isopropoxide was then added to the blend and a second specimen of test paper was impregnated, after which the papers were cured at 300°F. for about 30 minutes, and allowed to cool.

Table 3 summarizes tensile strength data obtained from the two specimens of paper, along with an uncoated paper specimen whose tensile strength was tested dry. The coated specimens were tested after soaking in water for 5 hours and the specimen containing the aluminum isopropoxide was tested again after soaking in water 62 hours. As the Table indicates the wet-strength of the paper was greatly increased by impregnation with the wax blend containing the aluminum isopropoxide, while only modest increases were obtained using the blend without aluminum isopropoxide. It is believed that the substantial increase in tensile strength may be due to the reaction of the aluminum isopropoxide not only with the ethylene-vinyl acetate copolymer, but also with the cellulose of the paper. In accordance with this theory the wax would be strongly bound or linked to the paper by entrapment in the gel complex of cellulose-aluminum isopropoxide-ethylene-vinyl acetate copolymer.

TABLE 3

| Paper Coating | Dry | Tensile Strength (p.s.i.) 5 hour soak | 62 hour soak |
|---|---|---|---|
| None | 12.0 | — | — |
| Blend without Aluminum Isopropoxide | — | 3.2 | — |
| Blend with Aluminum Isopropoxide | — | 15.0 | 6.8 |

Example 28

A blend of 170 grams of petroleum paraffin wax having a melting range of 143°F. to 150°F. (Aristowax 143/150) was melted and mixed with 40 grams of ethylene-vinyl acetate copolymer (Elvax 260) and 1.5 grams of aluminum isopropoxide at about 300°F. After 5 minutes a clear firm gel formed. The gel was molded into a sheet about one-fourth inch thick at 220°F. and 1,000 pounds pressure. The sheet had about the same flexibility as common shoe leather and although no tensile strengths were measured it was apparent that the sheet was much stronger than similar sheets made without the aluminum isopropoxide. Essentially similar results were also obtained in the same manner using 2.0 grams of aluminum-2-ethylhexoxide in place of the aluminum isopropoxide.

Examples 29 to 31

In these examples gels were made using aluminum secondary butoxy stearate at concentrations of 0.6, 0.9 and 1.2 weight-percent in wax-ethylene-vinyl acetate copolymer blends. After the blends had gelled they were heated at temperatures ranging between about 300° and 400°F. for a sufficient period of time to break the gel and convert it back to a liquid. As indicated below in Table 4 the length of the time required to break the gel increased with the proportion of aluminum alkoxide used.

In these examples the wax used was a low melting petroleum paraffin wax having a melting range between about 130° and 134°F. (Aristowax 130/134). The ethylene-vinyl acetate copolymer employed was a relatively high viscosity material having a melt index between about 1.5 and 2.5 (Elvax 260 marketed by E. I. DuPont de Nemours). The blends were prepared by first mixing the wax and copolymer at melting temperatures and then cooling the blend to about 160° to 170°F. after which the aluminum secondary butoxy stearate was added. The temperature was then raised and the mixture stirred every few minutes by hand. All 3 of the blends gelled within a few minutes and before the temperature had gone above 230°F. The gels were sufficiently rigid that they would not flow under their own weight when the beakers containing them were inverted. The rigid gels were heated at a temperature of between 300° and 400°F. until they broke into a liquid as indicated in the table below.

TABLE 4

| Example | Wax | Blend Composition (Wt-%) Ethylene-Vinyl Acetate Copolymer | Aluminum-sec Butoxy Stearate | Time to Break gel at 300°–400°F |
|---|---|---|---|---|
| 29 | 95.4 | 5.0 | 0.6 | 30 hours |
| 30 | 95.1 | 4.0 | 0.9 | 48 hours |
| 31 | 94.8 | 4.0 | 1.2 | 4 days |

Examples 32 and 33

In these examples compositions of wax, Elvax 260 and aluminum secondary butoxide were blended to form a gel and then heated at high temperatures in an attempt to break the gel. Example 32 was carried out in precisely the same manner as Example 31 except aluminum secondary butoxide was used in place of the aluminum secondary butoxy stearate. Surprisingly, the resulting gel did not break even after 5 days of heating at temperatures of about 350° to 400°F. It is thus apparent that the aluminum trialkoxides are more effective gel-forming agents than the dialkoxides.

In example 33 a gel was prepared using only 0.6 weight percent aluminum secondary butoxide which was dissolved in a blend of scale wax containing petroleum paraffin wax plus 5 percent oil and 8 weight-percent ethylene-vinyl acetate copolymer (Elvax 260). This blend gelled almost immediately upon heating and heating was continued at 350° for 3 hours and then at 300°F. for about 36 hours. At the end of this time the gel had broken and the blend was fluid and clear with the exception of a very few small lumps of solid gel which is estimated to amount to about 10 grams out of a total of 600 grams of fluid. This resulting fluid was sampled and found to have non-Newtonian characteristics with a range of viscosities of 148 to 163 centistokes at 210°F. and a range of 59 to 61 centistokes at 275°F.

The fluids obtained upon breaking the gels, regardless of the type of gel-forming agent used, are suitable for use as wax blend coating agents for coating or impregnating paperboard and the like.

In addition to the three essential ingredients of the novel compositions described herein, it is also contemplated to add the usual or conventional additives which are known to those skilled in the wax blending art. Thus, for example, in addition to the ester-olefin copolymer, it is also feasible to add other polymers to the wax blends. For example polyethylene, polystyrene and the like, as well as copolymers such as ethylene-propylene, copolymers can be added to the wax blends. Although these additives do not undergo reaction by ester exchange during the gel-forming reaction they like the wax are entrapped by the gel and retained in the rigid or semisolid structure even at high temperatures.

Those skilled in the art will recognize many other uses to which the compositions of this invention may be put. In any event, the ability of the gels to withstand temperatures far in excess of the melting point of the principal wax constituent, and even in excess of 300° to 400°F. in some cases, makes them highly useful. Also the liquid products which are obtained upon breaking the gels by prolonged heating at high temperatures provides the art with a novel method for modifying and controlling the viscosity of molten wax compositions.

Having described the invention, what is claimed is:

1. A method of coating articles comprising:
   1. preparing a molten blend of (a) about 50–98 weight-percent of a petroleum wax, (b) a copolymer of a lower olefin and a vinyl ester of a lower alkanoic acid, and (c) an aluminum polyalkoxide;
   2. applying said molten blend to the article to be coated before any substantial reaction occurs between said components (b) and (c); and
   3. heating the coated article at a temperature between about 200° and 450°F until the coating forms a solid gel.

2. A method as defined in claim 1 wherein said component (a) is a paraffin wax melting in the range of about 130° to 160°F.; said component (b) is a copolymer of ethylene and vinyl acetate; and said component (c) has the formula:

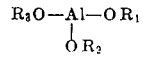

wherein $R_1$ and $R_2$ represent alkyl groups having two to 12 carbon atoms, and $R_3$ is either an alkyl group having two to 12 carbon atoms or an aliphatic acyl radical having 10–20 carbon atoms.

3. An article having at least a portion of its surface area coated with a heat-gelled blend of (a) about 50–98 weight-percent of a petroleum wax, (b) a copolymer of a lower olefin having two to four carbon atoms and a vinyl ester of a lower alkanoic acid having two to four carbon atoms, and (c) an aluminum polyalkoxide.

4. A wooden article coated as defined in claim 3.

5. A paperboard article coated as defined in claim 3.

6. An article as defined in claim 3 wherein said component (a) is a paraffin wax melting in the range of about 130° to 160°F.; said component (b) is a copolymer of ethylene and vinyl acetate; and said component (c) has the formula:

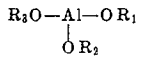

wherein $R_1$ and $R_2$ represent alkyl groups having two to 12 carbon atoms, and $R_3$ is either an alkyl group having two to 12 carbon atoms or an aliphatic acyl radical having 10–20 carbon atoms.

7. An article as defined in claim 3 wherein the weight percentages of components (a), (b) and (c) in said coating fall within the following ranges:

| Petroleum Wax | 50–98 |
|---|---|
| Copolymer | 2–40 |
| Aluminum polyalkoxide | 0.2–10 |

* * * * *